A. Leonard,
Casting Thimble Skeins.
No. 1,229.
Reissued Oct. 8, 1861.
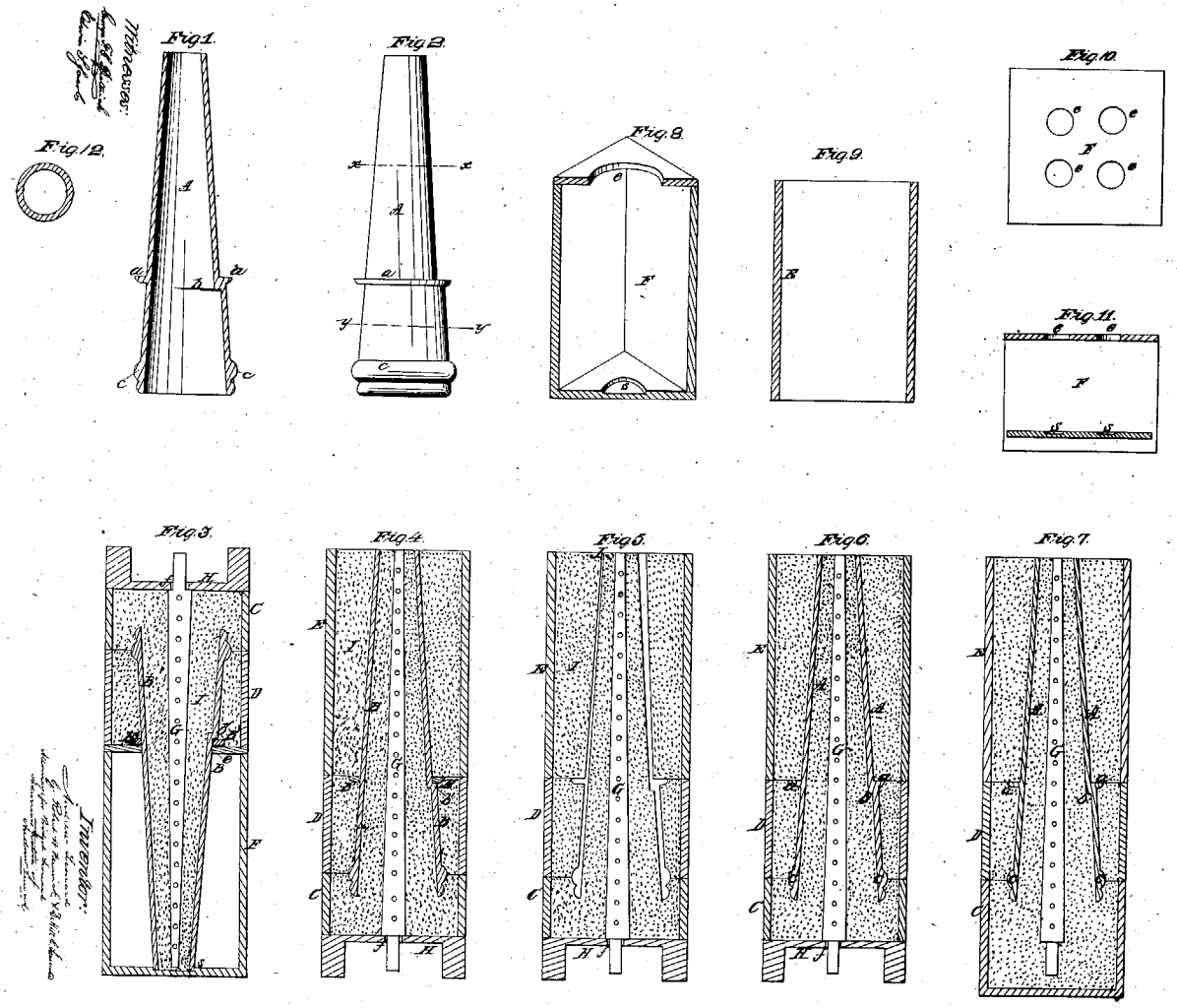
Witnesses:
Inventor:

A. Leonard,
Casting Thimble-Skeins.
No. 1,229. Reissued Oct. 8, 1861.
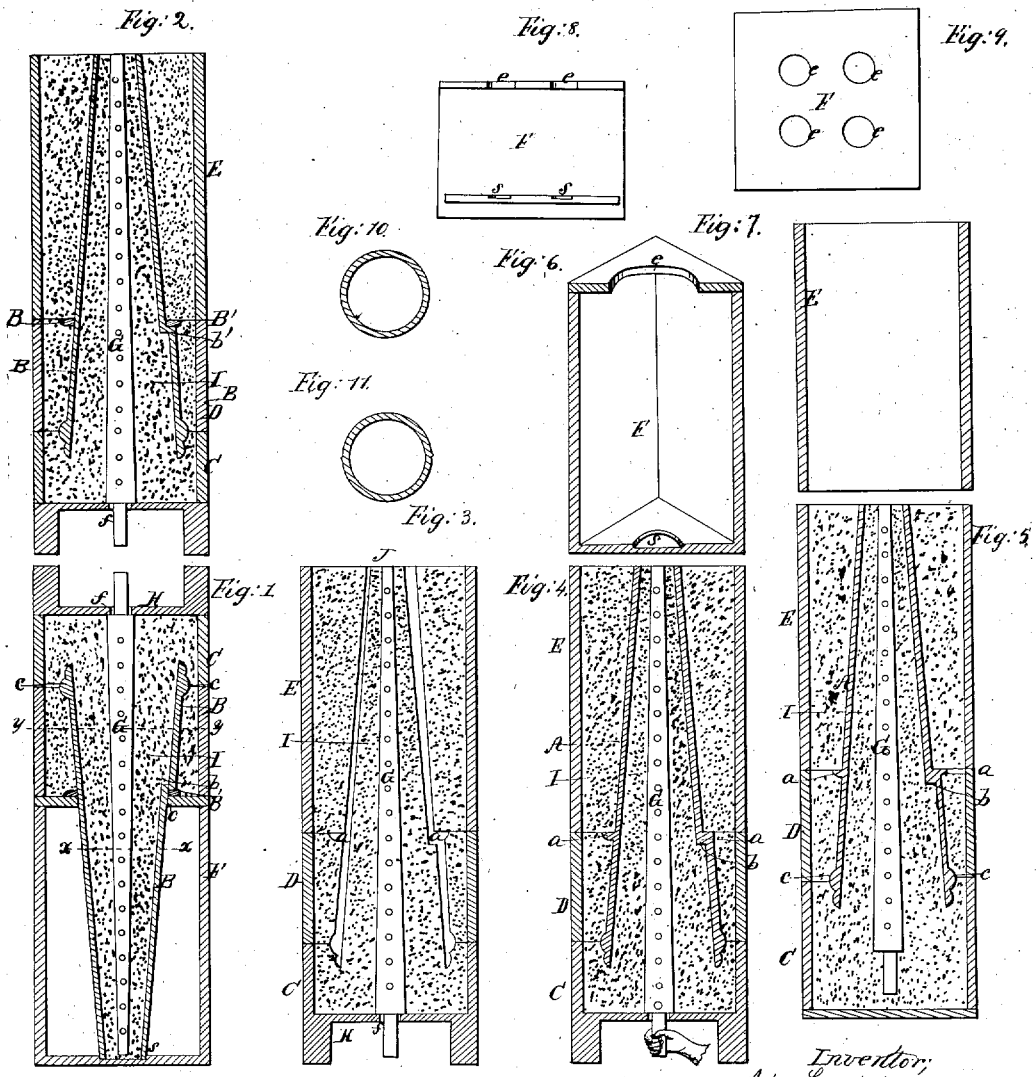
Witnesses;
Gustave Dieterich
Edwin Sheerb
Inventor;
Andrew Leonard deceased
By
Robert H. Pennington & Dewitt C. Lawrence
Attorneys for
Bridget Leonard
Administratrix of
A. Leonard

UNITED STATES PATENT OFFICE.

BRIDGET LEONARD, OF KENOSHA, WISCONSIN, ADMINISTRATRIX OF ESTATE OF ANDREW LEONARD, DECEASED.

IMPROVED CAST SEAMLESS THIMBLE-SKEINS FOR WAGONS.

Specification forming part of Letters Patent No. 16,688, dated February 24, 1857; Reissue No. 575, dated July 27, 1858; Reissue No. 1,229, dated October 8, 1861.

*To all whom it may concern:*

Be it known that A. LEONARD, deceased, late of the city and county of Kenosha, State of Wisconsin, did invent a new and useful Improvement in Cast Thimble-Skeins for Wagon-Axles, of which the following is a full, clear, and exact description, reference being had to the accompanying drawings, forming a part of this specification, in which—

Figures 1 and 2 represent the improved cast thimble-skein, and Figs. 3, 4, 5, 6, 7, 8, 9, 10, and 11 the means which are employed in its production. Fig. 12 is a section of a skein with seams.

Similar letters of reference in each of the several figures indicate corresponding parts.

The nature of this part of ANDREW LEONARDS'S invention consists in a cast thimble-skein for axles which is seamless both internally and externally, and has no portion of its chilled surface removed by turning or filing after it is withdrawn from the mold.

Cast thimble-skeins without seams internally have never been made by any other mode than that patented by ANDREW LEONARD under another patent of even date with this; and the only way in which cast thimble-skeins have been made seamless on their outer surface, by other modes than LEONARD'S, is by filing off the seams after the skeins have been removed from the molds. Thus filing or turning off the seams causes a destruction of the glazed or chilled surface of the skeins and lessens the durability and increases the frictional wear between the skeins and the boxes in which they run.

In order to demonstrate that a cast seamless thimble-skein can be manufactured, a description of the means which ANDREW LEONARD adopted and of the skein itself will now be given.

The cast thimble-skein A, Figs. 1 and 2, is of taper form longitudinally and cylindrical transversely in the line *x x*, and elliptical in the line *y y*. A collar or shoulder, *a*, is formed on its outer circumference all round, and on its inner circumference a shoulder, *b*, which extends partly around, is formed. There is also a bead, *c*, formed on the outer surface of the elliptical portion of the skein. The inner and outer circumferences of the skein are glazed or chilled, and are free from longitudinal seams, such as are shown at *d d*, Fig. 12, when it leaves the sand mold.

B, Fig. 3, represents a tapering tubular pattern, similar in form to an axle-skein, excepting that the part which forms the collar *a* is not formed on it. This pattern is used vertically, and forms the impression for the whole of the interior and exterior of the skein, excepting the collar *a*.

B′ is a loose pattern of ring form placed over the small end of the tubular pattern B, and forced up snugly against the shoulder *b′* of said pattern. This ring pattern gives the form or impression for the collar *a* of the skein.

C D E F is a box or other shaped flask, formed of a series of sections, one of which—that F—serving as a pattern guide and support during a certain stage of the operation, and then going out of use to make place for the section E, as will be presently described. The dividing lines of the several sections all run horizontally.

G is a vertical semicircular hollow-core bar for adjusting or centering the core whenever it gets out of true.

The mode of operation is as follows: First, arrange the open section F in proper position, and place ring-patterns B′ on its top and concentric with the guide-holes *e e e e* therein; then insert the small ends of patterns B through the ring patterns and holes until the shoulders *b′* fit snugly against the ring patterns, and the ends of the tubular patterns enter circular recesses *s* in the bottom-board of section F, as shown in Fig. 3. The pattern B B′, being now centered and steadily confined, the section D is placed on top of section F, and within it sand is placed and rammed tightly all round the butt or elliptical portion of the pattern up to the center of the bead *c*. After molding section F up properly and putting on parting-sand, section C is placed on top of D, as shown in the drawings, Fig. 3, and into it sand is placed and rammed tightly. Some sand or mold is also thrown into the tubular patterns B at this stage and the core-bars G adjusted centrally in said patterns. Then the operation of filling the patterns and ramming the sand is continued until the sand rises level with the upper edge of section C. The sand thus rammed in the sections C D and in the pattern is confined by means of a board, H, said board having holes *f* through it for the passage of the handles of the core-bars, and also having cleats on its upper surface for the purpose of holding the board elevated above the floor or ground when the flask is inverted, as shown in Fig. 4. When the operation has proceeded to the extent shown in Fig. 3, the several sections are firmly clamped together and the whole adjusted, as shown in Fig. 4, so that the largest end of the pattern is down and molded in sand, while the smallest end is up and not covered with sand in the open section F of the flask. The clamps are then removed, and the open section F lifted off, its use as a support to the ring pattern and as a guide to the tubular pattern being no longer necessary. The removal of section F makes room for section E, and as the sand has only been molded up to the flat surface of the collar B′, it is necessary to place section E on section C, but, before doing so, parting-sand must be sprinkled on the molded sand in section C. All being ready, put the sand in section C, and ram it until it rises even with the edge of section C, as represented in section 5. This being done, the next part of the operation is to apply the cope (not shown) with other parts for the purpose of finishing the small end of the mold, so that it will form a screw-thread on the small end of the skein; but as this latter operation does not constitute a part of the improvement in skeins that ANDREW LEONARD claimed under his surrendered patent, it is not deemed necessary to explain it here. It also is now commonly practiced in molding axle-skeins, and will be readily understood by those skilled in the art.

To remove the pattern without injuring the impression formed by it in the sand, lift off the cope, (not shown,) then section C, known as the "upper cheek-piece," then the section D, known as the "lower cheek-piece." Said parts being removed, the tubular pattern B can be moved up over the sand-core of the mold. The ring pattern and the tubular pattern having been removed, the sand-core of the mold remains standing in a vertical position, and has for its support a portion of the sand-mold which has the external impression of the skein formed in it, as shown in Fig. 4. The sections E and D are now readjusted to their positions, as shown in Fig. 5, and when thus adjusted they, in connection with section C and the core I, form the mold for the entire skein, as shown in Fig. 5. In case the core I springs laterally at its upper end, and thus gets out of true, as illustrated at J, the molder takes hold of the lower end of the core-bar and adjusts the core to the position shown in Fig. 6, he being enabled to make the adjustment accurately by keeping his eye on the upper end of section E. After the adjustment is made, the cope, (not shown,) with mold for forming the screw-threaded end of the skein, is placed on section E. All now being ready, the molten metal is run into the mold near the base, and the axle-skein shown in Figs. 1, 2, and 6, with a screw-thread plug (not shown in drawings) in its small end, is the result of the whole operation.

In Fig. 7 the core-bar extends down into solid sand, the section C of flask being lengthened for that purpose. The end of the bar thus molded in the sand will afford support to the core, and thus tend to prevent springing or inclining out of the center of the core when the pattern is withdrawn. It, however, is far preferable to have the core-bar extend outside of the flask, so that the core may be adjusted by hand.

A seamless thimble-skein, perfect and true in the rough casting, is a very important and useful article of manufacture, as skeins cast in divided horizontal patterns necessarily have longitudinal seams on their inner and outer circumferences, and said seams, at least on the outer surface of the skeins, require to be filed or turned off, and thus are more expensive, and are less durable, because the chill or glazed surface is destroyed, and they work with greater friction, as the surface of the metal exposed by turning or filing is much softer than that which is exposed when the casting comes direct from the mold.

Having described the seamless cast thimble-skein of ANDREW LEONARD, and shown one practical mode of manufacturing the same, it remains to be stated that under this patent the means shown, nor any other means, are not claimed; also, that in a patent of even date with this substantially said means are claimed. Therefore

What is claimed under this patent as the invention of ANDREW LEONARD, and desired to be secured by Letters Patent, is—

A cast seamless thimble-skein, substantially such as specified, which is not made seamless by filing, turning, or otherwise being manipulated with after it leaves the mold.

Witness my hand and seal this 10th day of July, 1861, in the application for reissue of ANDREW LEONARD'S patent for improvement in seamless cast thimble-skein.

BRIDGET LEONARD, [L. S.]
*Administratrix of Andrew Leonard, deceased.*

Witnesses:
R. A. PHELAN,
THOS. ENGLISH.